Feb. 10, 1931.  C. B. PERKINS  1,791,972
STABILIZING DEVICE
Filed Aug. 10, 1928
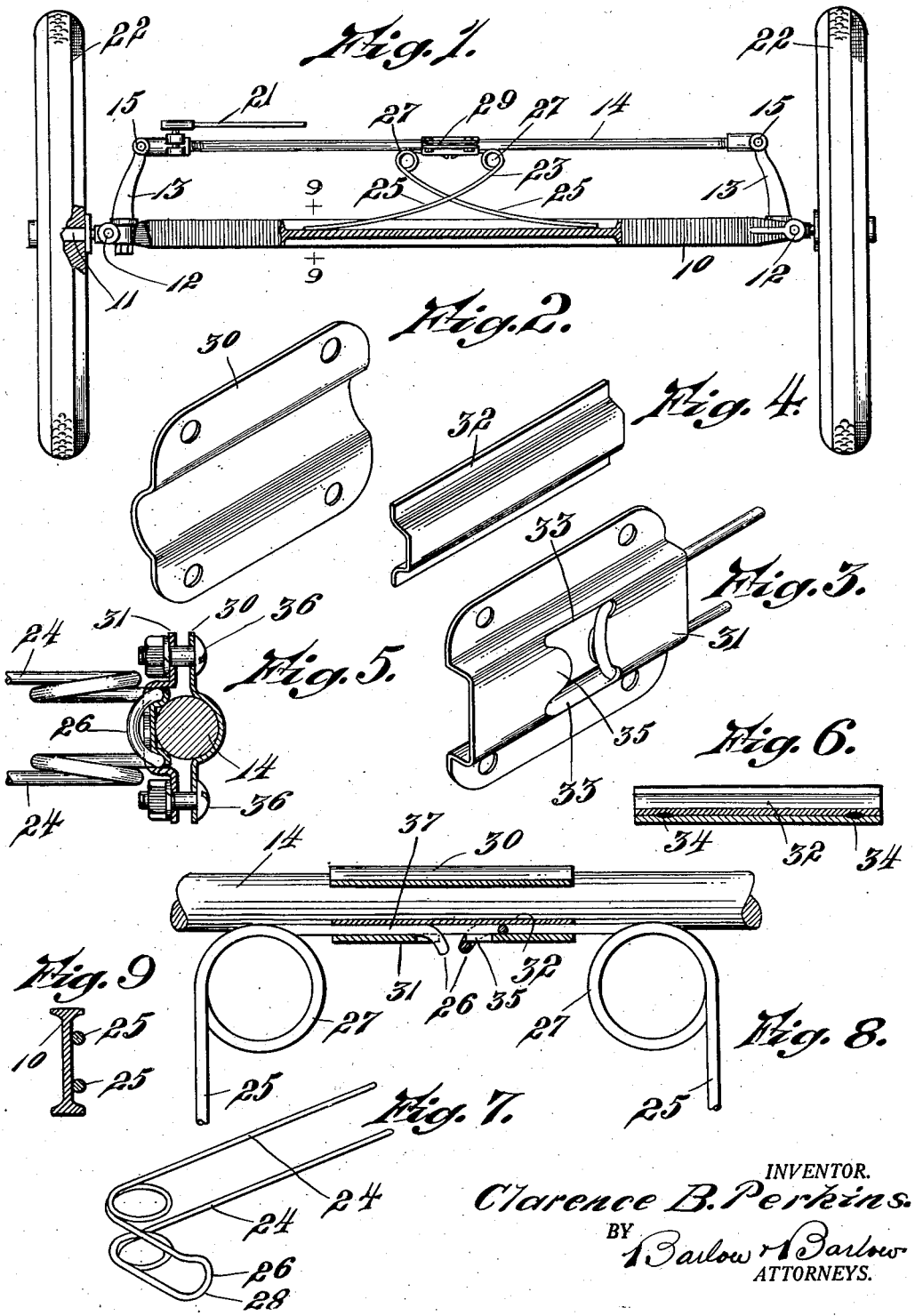
INVENTOR.
Clarence B. Perkins.
BY Barlow & Barlow
ATTORNEYS.

Patented Feb. 10, 1931

1,791,972

UNITED STATES PATENT OFFICE

CLARENCE B. PERKINS, OF PROVIDENCE, RHODE ISLAND, ASSIGNOR TO APCO MOSSBERG CORPORATION, OF ATTLEBORO, MASSACHUSETTS, A CORPORATION OF RHODE ISLAND

STABILIZING DEVICE

Application filed August 10, 1928. Serial No. 298,845.

This invention relates to an improved construction of stabilizing device to be attached to the steering mechanism of motor vehicles; and the invention has for its object to provide simple and effective means which may be easily applied to the cross rod to exert frictional resistance to the endwise movement of the cross rod and so prevent the vehicle from vibrating or wabbling due to the oscillating of the forward wheels.

A further object of the invention is to clamp one or more spring arms to the cross rod which connects the steering knuckles and dispose these arms so as to exert a frictional sliding resistance to the endwise movement of the rod to prevent vibrations of one wheel from being transmitted through the rod to the other wheel and so prevent the so-called shimmying or vibrating motion of the forward wheels of a vehicle.

A still further object of the invention is to form a friction wire member with a pair of spaced arms which are connected by a bridge portion which extends into a clamp plate and are provided with means for preventing withdrawal from the clamp, a resilient coil in each of these arms assisting in exerting a frictional spring pressure against the axle.

With these and other objects in view, the invention consists of certain novel features of construction, as will be more fully described, and particularly pointed out in the appended claims.

In the accompanying drawings:

Fig. 1 is a top view showing the axle with the steering knuckles pivotally attached to the ends thereof and connected by a cross rod also showing my stabilizing device as attached to the cross rod.

Fig. 2 is a perspective view of the top clamp plate.

Fig. 3 is a perspective view of the bottom clamp plate.

Fig. 4 is a perspective view of the intermediate clamp plate.

Fig. 5 shows the plates as clamped to the cross rod and showing the plates as engaging the resilient friction arms.

Fig. 6 is a central sectional view showing the intermediate clamp plate as spot welded to the bottom clamp plate.

Fig. 7 is a detail showing one of the friction members as formed of wire bent in substantially U-shaped having side arms connected by a bridge portion.

Fig. 8 shows two of these friction members as bound in position by being clamped to the cross rod.

Fig. 9 is a section on line 9—9 of Fig. 1 showing the arms of the friction member as engaging the groove of the I-shaped axle.

It is found in practice that certain parts of the steering mechanism of automobiles quickly wear and so permit a wabbling motion of the front wheels which are mounted on knuckles pivoted to the opposite ends of the forward axle, which steering knuckles are connected by a cross rod so that the wheels may be swung in unison to direct the course of the vehicle. It is also found in practice that the vibrations of one wheel are transmitted through this cross rod to impart similar vibrations to the opposite wheel and that where both wheels vibrate in unison a wabbling or so-called shimmying action or motion is imparted to the vehicle, but if the cross rod is frictionally held against a free endways movement, this shimmying motion is prevented and in order to accomplish this stabilizing effect in a simple and effective way, I have clamped or secured one or more resilient friction arms to the cross rod, the arms being arranged to extend into frictional engagement with the adjacent face of the axle so as to slide back and forth along the same as the rod is moved endwise in steering the vehicle. Another feature of my invention is that the tension of the friction springs in acting upon the cross rod has a tendency to return the wheels to central position after having been swung to one side; and the following is a detailed description of the present embodiment of my invention and showing one means by which these advantageous results may be accomplished:

With reference to the drawings, 10 designates the usual vehicle axle to each end of which a steering knuckle 11 is pivoted at 12. Each knuckle is provided with an arm 13 set at substantially right angles to the axis of the wheel and a connecting cross bar 14 is pivoted at 15 to these arms 13 thereby connecting these steering knuckles together, a steering motion is imparted to this cross rod and knuckles through the steering rod 21 and steering hand wheel (not shown).

In order to prevent vibration of one wheel 22 from being freely transmitted through this rod to the opposite wheel, I have mounted a stabilizing device 23 to exert sufficient frictional resistance to the endwise movement of this rod 14 to prevent the transmission of vibrations from one wheel to another but without interfering with the steering of the vehicle.

One form of mechanism for exerting this frictional resistance is that of providing one or more frictional members 24, each of which comprises a length of wire bent into U-shape having side arms 25 connected together by a cross bridge 26, the arms a short distance from the bridge being each provided with a resilient coil 27 and the bridge is preferably formed with an offset loop as at 28 for the purpose presently described.

In order to attach these friction members to the cross rod I have provided a clamp 29 having a top clamp plate 30, a bottom plate 31 and an intermediate plate 32. The bottom clamp plate is provided with an opening 33 through which the offset 28 of the bridges of each of the friction members extends and the tongue 35 of this bottom plate extends into this bridge loop 28 to prevent the springs from being inadvertently removed even tho the clamp plates become loosened.

The parts 37 of the friction members are retained between the intermediate plate and the bottom plate preferably by spot welding these two plates together as at 34, see Figures 5 and 6, whereby the two friction units 24, each with its pair of friction arms 25, are permanently connected to the bottom clamp plate ready to be secured to the cross rod by simply positioning the top plate and binding the two together by bolts 36.

The arms 25 of the different units are now folded preferably to cross each other in the manner illustrated in Fig. 1 so that an extended end portion of each of the four arms of the two units will lie in the groove of the axle to frictionally slide against the axle surface and so exert just the proper amount of frictional resistance to the free endways movement of the cross rod.

It will be noted by my improved construction that two of these frictional units are applied to the cross rod, each unit comprising a length of wire bent to form a pair of arms connected by a bridge portion whereby the use of a plurality of arms just the proper amount of friction may be exerted between the axle and the cross rod and by employing four wires instead of two heavier wires or plates these wires may be readily bent by the hand of the person who applied the device without being obliged to use a special tool for this purpose, also these round wire arms will best conform to any curvature in the axle.

My improved stabilizing device is very simple and practical in construction and is effective in its operation and may be readily applied to the cross rod of a motor vehicle to operate between the cross rod and axle and by employing a coil in each of the arms these arms are rendered sufficiently resilient or flexible to exert just the proper amount of frictional resistance required to eliminate or prevent the so-called shimmying or wabbling motion of the vehicle.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a motor vehicle, an axle, wheel carrying steering members pivoted to the axle ends, a cross rod connecting said steering end members, a friction member having a pair of spaced resilient side arms connected together by a bridge portion, a clamp binding said bridge portion to said rod, a member engaging said bridge portion to prevent said friction members from being withdrawn from said clamp, said arms extending to lay with frictional pressure against the axle.

2. In a motor vehicle, an axle having steering members pivoted to its ends, a cross rod connecting said steering end members, a friction member having a pair of spaced arms connected by a bridge portion, said bridge portion having an offset, a clamp on said rod binding the friction member to the rod, said clamp having an opening to receive said offset, said arms each having a resilient coil and arranged to extend to lie with frictional pressure against the axle.

3. In a motor vehicle, an axle having steering members pivoted to its ends, a cross rod connecting said steering end members, a friction member comprising a pair of spaced resilient arms connected by a bridge portion, and top, bottom and intermediate clamp plates secured to said cross rod, the bridge portion of said members being secured between said bottom and intermediate plates, said arms each having a resilient coil and arranged to extend into frictional engagement with said axle.

4. In a motor vehicle, an axle, steering knuckles pivoted to the axle ends, a cross rod connecting said knuckles and spaced from said axle, a clamp device on said cross rod intermediate the ends thereof, and two spring members each comprising a pair of spring arms joined by a bridge portion, said bridge portions being secured in said clamp device and said spring arms engaging said axle.

5. In a motor vehicle, an axle having steering members pivoted to its ends, a cross rod connecting said steering end members, a friction member having a pair of spaced arms connected by a bridge portion, said bridge portion having an offset, a clamp on said rod binding the friction member to the rod, said clamp having an opening to receive said offset, and a locking finger on said clamp extending into said opening and said offset, said arms each having a resilient coil and arranged to extend to lie with frictional pressure against the axle.

In testimony whereof I affix my signature.

CLARENCE B. PERKINS.